Fig. 1.

Patented July 4, 1933

1,916,853

UNITED STATES PATENT OFFICE

ERNEST W. WESCOTT, OF NIAGARA FALLS, NEW YORK, ASSIGNOR, BY MESNE ASSIGNMENTS, TO SULPHIDE CORPORATION, A CORPORATION OF DELAWARE

PROCESS OF TREATING ORES

Application filed June 1, 1929. Serial No. 367,814.

This invention relates to improvements in processes of treating ores containing iron and usually other values such as nickel, cobalt, copper, zinc, lead, precious metals, chromite, etc. The invention is directed broadly to the treatment of both oxid and sulfid ores, and when the latter are treated sulfur is recovered as one of the values.

In its broader aspect, the invention comprises the treatment of ores of the types indicated for the recovery therefrom of the iron as oxid free from gangue and either free from any but commercially unimportant traces of other metals, or admixed with the oxids of certain selected ones of the metals originally present in the ore, e. g., nickel and/or cobalt.

The invention is further directed to the recovery in concentrated anhydrous form of the chlorids of the heavy metals such as copper, zinc and lead, and optionally nickel and cobalt when present, and to the recovery separately of these, and also to the recovery in anhydrous form if desired of the chlorids of metalloids such as arsenic and antimony, and the chlorid of bismuth. When ores containing sulfur are treated it is an aim of the process to recover the sulfur in the elemental form and practically free from heavy metal chlorids.

The invention involves the cyclic recovery and re-use of chlorin in various active forms, and it is further characterized by the fact that the chlorinating reaction is so controlled as to convert iron present in the ore to ferrous chlorid, and the temperature at which chlorination of the ore is carried out and the degree of dilution of the chlorinating gases are so controlled in balance that substantially all of the chlorids of heavy metals other than iron that become chlorinated under the conditions of operation, and all or a substantial part of the iron, as ferrous chlorid, are separated from the gangue as vapors. The vapors of ferrous chlorid and of like chlorids (e. g., the chlorids of copper, zinc, lead, cobalt, nickel, etc.) so produced are then brought into the solid condition and separated from sulfur vapors, if present, and the inert gases. Iron present as ferrous chlorid in the mixture of solid chlorids so obtained is then oxidized, either directly or after conversion to ferric chlorid, with formation of a chlorinating gas and without the oxidation of other chlorids, the chlorinating gas being recycled to the chlorinating zone for treatment of additional ore.

One of the principal advantages of the invention is that by its use chlorids formed may be immediately or quickly removed from the surfaces of the ore being chlorinated so that the ore surfaces are not kept out of contact with reacting gases either by solid or fused chlorids. Thus, the state of subdivision of the ore treated becomes relatively unimportant. Also, since the process makes possible the avoidance of the existence in the chlorinating step of appreciable amounts of fused chlorids, the chlorination of ores may be carried out above the fusion temperature of mixed chlorids formed without requiring the use of costly and cumbersome apparatus such as is ordinarily required for the handling of fused chlorids.

This invention can be practised in various forms depending upon the particular ore being treated and the particular results among those possible which it is desired to obtain. Five embodiments of the invention are described hereinafter, and in connection with the description reference is made to the attached drawings in which.

Process as applied to iron oxid ores

The process may advantageously be applied to iron oxid ores, such as those of the north coast of Cuba, which in the bone dry state, (i. e., substantially free from water either of condition or of combination) may contain 50% of metallic iron present as $Fe_2O_3$, around 1% of nickel and cobalt combined as their oxids, 1.5 to 2.5% of chromium as $Cr_2O_3$, traces of sulfur, phosporus, etc., and the balance gangue containing much aluminum oxid.

When an ore of this sort is to be treated, it is first brought to the bone dry state above referred to by a suitable drying operation and then treated to reduce the iron, nickel and cobalt to metallic condition by the use of reducing gases such as CO; in other words, the ore is dried and reduced or metallized in known ways without, however, reducing the chromium or the alumina. Alternatively, the dry ore may be mixed with carbon in quantity sufficient to combine with the oxygen of the iron, nickel and cobalt, or a reducing gas, such as carbon monoxid free from any form of hydrogen (e. g. air blown producer gas), may be mixed with the chlorinating gases. This procedure is not recommended unless it is desired to recover the chromium as chlorid.

Figure 1:
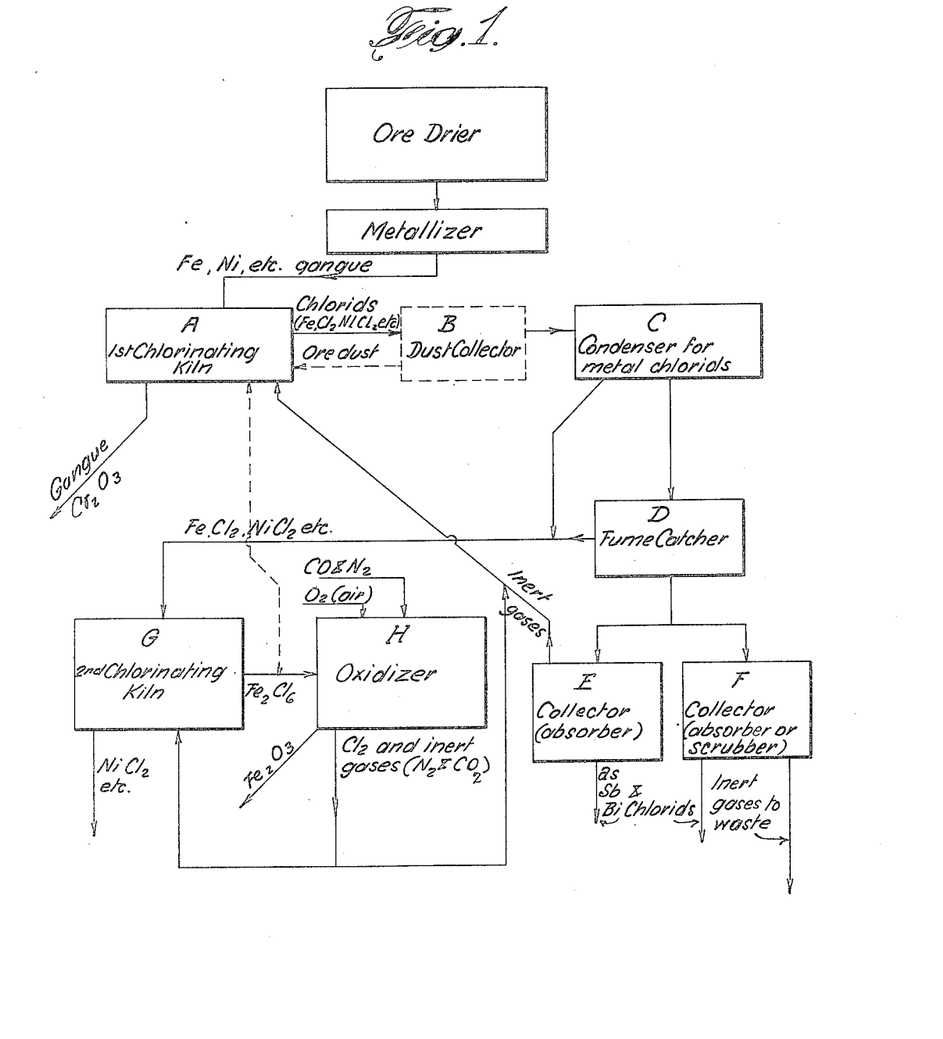
Fig. 1 is a flow sheet illustrating diagrammatically one form of the process as applied to the treatment of oxid ores.

The ore is next passed, preferably while still hot, from the above described reducing and/or drying operation into the chlorinating furnace A of Fig. 1. This furnace may be of any type permitting of intimate contact of the gases and solids passed therethrough, such for example as one either of the rotary kiln type or of the shaft furnace type. In furnace A the iron, nickel and cobalt of the metallized ore are chlorinated under such conditions as to convert the iron to ferrous chlorid and the nickel and cobalt to chlorid form and at such a temperature under the conditions obtaining that all of these chlorids are substantially completely vaporized and pass out of the furnace.

The gangue of the ore passing out of furnace A carries with it chromium oxid which may be recovered by mechanical concentration methods. There is little if any formation of chromium chlorid unless reducing agents have been present during chlorination so as to effect reduction of the chromium oxid. The amount of chromium converted to chlorid may be kept so small as not to warrant commercial consideration.

With an ore of the analysis described, complete volatilization of ferrous, nickel and cobalt chlorids can be effected, using chlorin exclusively as chlorinating agent, at temperatures of around 800° C. with gases containing 7 volumes of $Cl_2$ to 93 volumes of inert gases; at temperatures around 825° C. with gases containing around 11 volumes of $Cl_2$ to 89 volumes of inert gases; and at temperatures around 850° C. with gases containing around 15 volumes of chlorin and 85 volumes of inert gases.

One important function of the inert gases will be readily appreciated when the above given operating temperatures are compared with those which are necessary in the absence of inert gas. With the above mentioned Cuban iron ore and when operating with substantially pure chlorin, such as electrolytic chlorin, temperatures considerably in excess of 1000° C. are required to effect complete volatilization of the iron as ferrous chlorid. The use of such excessively high temperatures causes many difficulties. One is that at temperatures in excess of 1000° C. chromium oxide begins to be extensively acted upon by chlorin even in the absence of reducing agents. Difficulties of construction and of operation of apparatus are enhanced, and it frequently becomes necessary to use fuel which would not be needed when operating at the lower temperatures.

The chlorid vapors formed, and the inert gases introduced to the furnace with the chlorinating agent, pass out of the furnace and are preferably led to a dust chamber B, which is heat insulated to prevent the condensation of chlorids, wherein ore dust settles out and may from time to time be returned to furnace A. The use of this dust chamber is, however, optional and may be dispensed with unless the nickel and cobalt chlorids are to be subsequently treated by a process the operation of which is interfered with by the presence of small quantities of gangue and ore dust.

The chlorid vapors and accompanying gases are led from the dust chamber when used, or directly from the furnace A to the chlorid condenser C wherein the gases and vapors are systematically cooled by being passed downwardly through metallic pipes furnished with continuously operating internal scrapers. In this manner the chlorids are caused to condense largely on the cold surfaces instead of as an impalpable fume as is the case when the gases and vapors are cooled merely by passing through large chambers with cold walls. By the use of such a condenser the amount of fume produced is small and may be recovered if desired by passing the gaseous efflux from the chlorid condenser C through a fume catcher D which may consist of a bag house with asbestos bags or may be an electrical precipitator. Both C and D are usually kept at temperatures above the dew points of other condensable substances present in the gaseous current; although where the amount of sulfur or metalloids present is small the temperature may be permitted to fall below the range indicated.

The gaseous efflux leaving D may be split into two portions, one portion, so proportioned as to contain the amount of inert gas required for recycling with the chlorinating agent, is directed through a collector E and thence to furnace A, the other portion being directed through a collector F. The collector E serves to separate out and condense metalloid chlorids, and preferably consists of a filter of adsorbent carbon or other adsorbent substance. At least two such collectors should be furnished so that one may be cut out of circuit from time to time for regeneration by heating to drive out the adsorbed chlorids. The chlorids so removed from the filter being no longer associated with large volumes of inert gas can then be recovered by condensation. The use of the collector E is advised where there are considerable quantities of metalloids in the ore and especially when the burden of gases going to E is large compared to the burden going to F.

The collector F may be an adsorber of the same nature as E or may be simply a scrubber wherein the metalloid chlorids are collected by use of water or other liquid spray. Where the amount of such chlorids is small or of no great value F may be omitted.

The solid chlorids collected in C and D are transferred, preferably hot but in any case with careful exclusion of moisture, to the furnace G. The furnace G, which may be a rotary kiln, is best provided with a lining of chrome steel and should be provided with heavy heat insulation. If the materials are fed to this furnace in a sufficiently preheated condition and if adequate heat insulation is provided, the application of additional heat is not needed. If these conditions are not met, additional heat should be supplied sufficient in amount to maintain the temperature within the furnace G above the vaporizing temperature of ferric chlorid in the presence of the amount of inert and other gases present in the furnace. For this purpose an air bath or other fluid or a liquid bath promoting uniformity of application and distribution of heat may be used.

According to the form of the invention represented in Fig. 1, a stream of chlorin, derived from a later operation to be presently described, in admixture with inert gases,—nitrogen and usually small amounts of carbon dioxid—is passed into the furnace G and caused to flow therethrough in contact with the solid chlorids fed into the furnace.

As indicated above the minimum temperature of operation to be maintained in the furnace G should be at or above the vaporizing temperature of ferric chlorid in the gases as constituted. On the other hand, the temperature should not be permitted to rise to the point where any substantial amounts of nickel and cobalt chlorids will be vaporized and carried out of the system with the ferric chlorid. Stated in terms of temperature ranges, it is believed that the temperature of G should never be below 280° and best not below 300° C. and that the upper limit should not exceed 400° and preferably should not exceed 350° C. While these temperatures are valuable for reference purposes, control should be had by observation of the products of the furnace. If the temperature in the furnace is too low, solid ferric chlorid will be found mixed with nickel and cobalt chlorids exiting from the furnace. If the exiting gases contain any commercially appreciable amounts of vapors of nickel or cobalt chlorids, then the temperature of G is too high.

The gases exiting from G are led, preferably without appreciable cooling, to the oxidizer H wherein the ferric chlorid is burnt with the oxygen of the air and, preferably, with the assistance of some carbon monoxid (air blown producer gas free from hydrogen), to ferric oxid and chlorin as described in my Patent No. 1,898,702, dated February 21, 1933. If desired, the gases may be passed through a dust chamber on their way to the oxidizer.

Operating in this way there exits from the oxidizer ferric oxid in a coarsely crystalline state ready for blast furnace use. The chlorin, together with inert gases exiting from the oxidizer, is split into a minor stream which goes to the furnace G and a major stream which goes to the furnace A. Instead of directing all of the ferric chlorid vapors and inert gases exiting from the furnace G to the oxidizer H, a portion may be led directly to furnace A.

Figure 2:
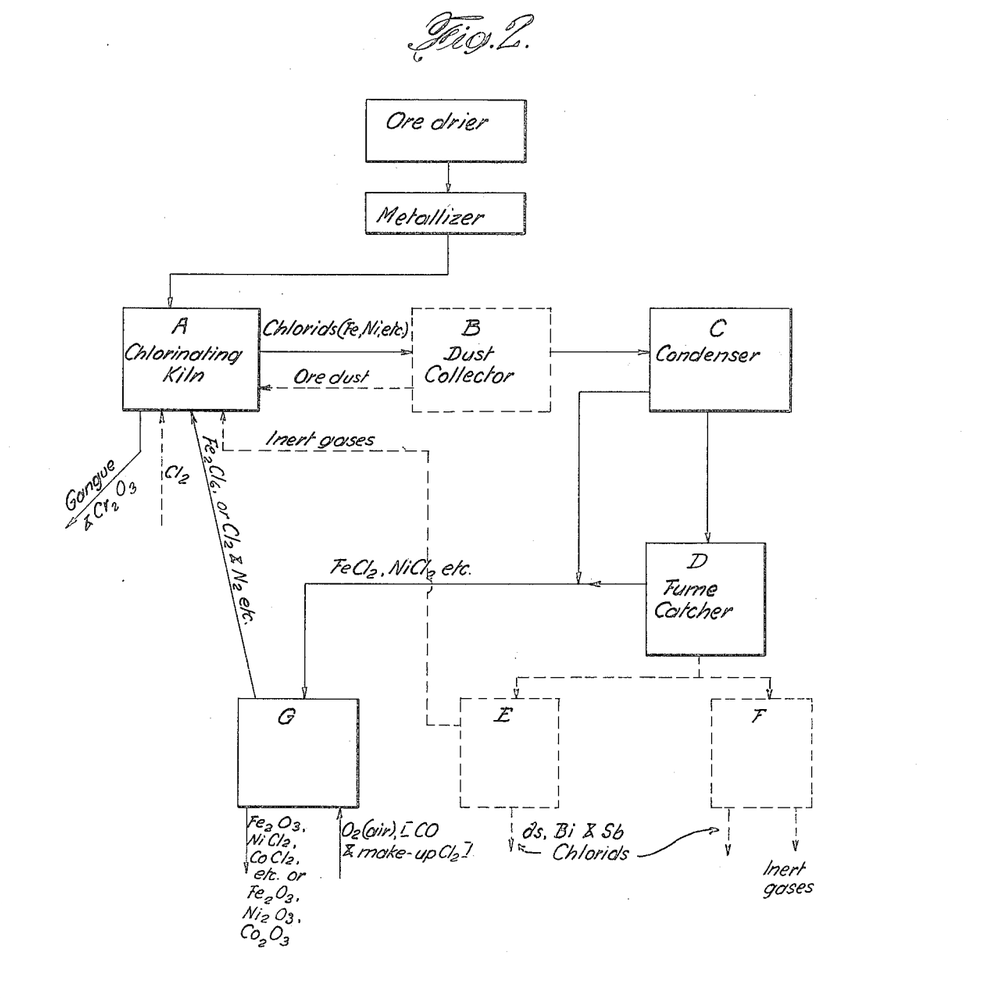
Fig. 2 is a flow sheet illustrating diagrammatically another form of the process as applied to the treatment of oxid ores.

Another modification of the process that may advantageously be applied to the above described Cuban ores and similar oxid ores of iron, particularly when the separation that it is desired to effectuate is that of the iron, nickel and cobalt on the one hand from the gangue and chromium on the other, is represented by Fig. 2. This modification of the process, however, may also be used to effectuate the complete separation of the iron from the other values as in Fig. 1, the only difference being that the iron oxid is usually obtained in finely divided powdered form and that the nickel and cobalt are recovered by dissolving their chlorids from the iron oxid.

In this modification of the process A, B, C, D, E and F are operated in the same manner as in Fig. 1. When it is desired to produce finely divided iron oxid with recovery of nickel and cobalt as chlorids in solution, furnace G may be a rotary kiln as indicated above in referring to Fig. 1. The temperature in it must, however, be rather carefully controlled. The lower limit is as before; the upper limit of temperature is that at which commercially undesirable amounts of nickel and/or cobalt appear as oxid along with the iron oxid. The process is usually operated at between 280° and 325° or 350° C.; at 400° C. there is quite appreciable oxidation of nickel chlorid. The condensed chlorids from C and D are fed into G, and the exit gases from G pass into kiln A. Preheated air is passed into G and caused to pass therethrough in countercurrent to the chlorids. It is found to be desirable to feed the make-up chlorin with this air, since by so doing a somewhat wider range of temperatures is permitted. This is particularly desirable when cobalt is present. The air may be preheated indirectly or by burning in it either before or after it enters G a suitable fuel, preferably carbon monoxid or hydrogen-free producer gas. There exits from G finely divided ferric oxid, together with nickel and cobalt chlorids. These chlorids are readily soluble and may be recovered in solution by leaching the ferric oxid and then refining them in known ways.

As has been indicated above, it is sometimes desirable to throw the cobalt, or the cobalt and nickel, directly with the iron as oxid. When this is desired, the make-up chlorin is not added to the air entering G but is passed instead directly to furnace A; the furnace G is also operated at a higher temperature,—sufficiently high so that the nickel and cobalt chlorids are substantially completely oxidized. The oxids produced should be free from commercially important quantities of water soluble nickel and cobalt; if they are free from water soluble nickel, cobalt need not be tested for. While the temperature control should be made to depend upon analysis, with ores containing 2 to 4% of nickel, temperatures of from 450 to 500° C. are satisfactory. With countercurrent operation, the lowest temperatures should be used that will give the completeness of oxidation desired.

Too high temperatures are liable to cause volatilization of chlorids, particularly of nickel chlorid, and escape of the latter from the kiln along with the chlorinating gases going to A, thereby causing an unnecessary recirculation of materials and consequent reduction of effective capacity of the equipment. To prevent this and to permit the use of higher temperatures, it is often found desirable to reverse the flow of the gases through G, bringing in the preheated air at the same end with the chlorids and taking out the gaseous ferric chlorid stream at the same end as the ferric oxid. When operating thus with concurrent flow of gases and with proper control of the supply of air there does not appear to be any upward limit to the temperature that may be used, and in so operating it is preferable to substitute for the rotary kiln a stationary brick chamber into which the chlorids may be blown by mechanism much the same as is used in the burning of powdered coal. With this form of operation the oxidation is advantageously carried on at temperatures around 850° to 900° C. At this temperature range the iron and nickel oxids are obtained together in a coarsely crystalline state ready for immediate blast furnace use. At the higher temperatures progressively greater amounts of chlorin may be recovered as such instead of as ferric chlorid and at 800–900° C. substantially all of the chlorin may be so recovered.

Process as applied to sulfid ores

Figure 3:
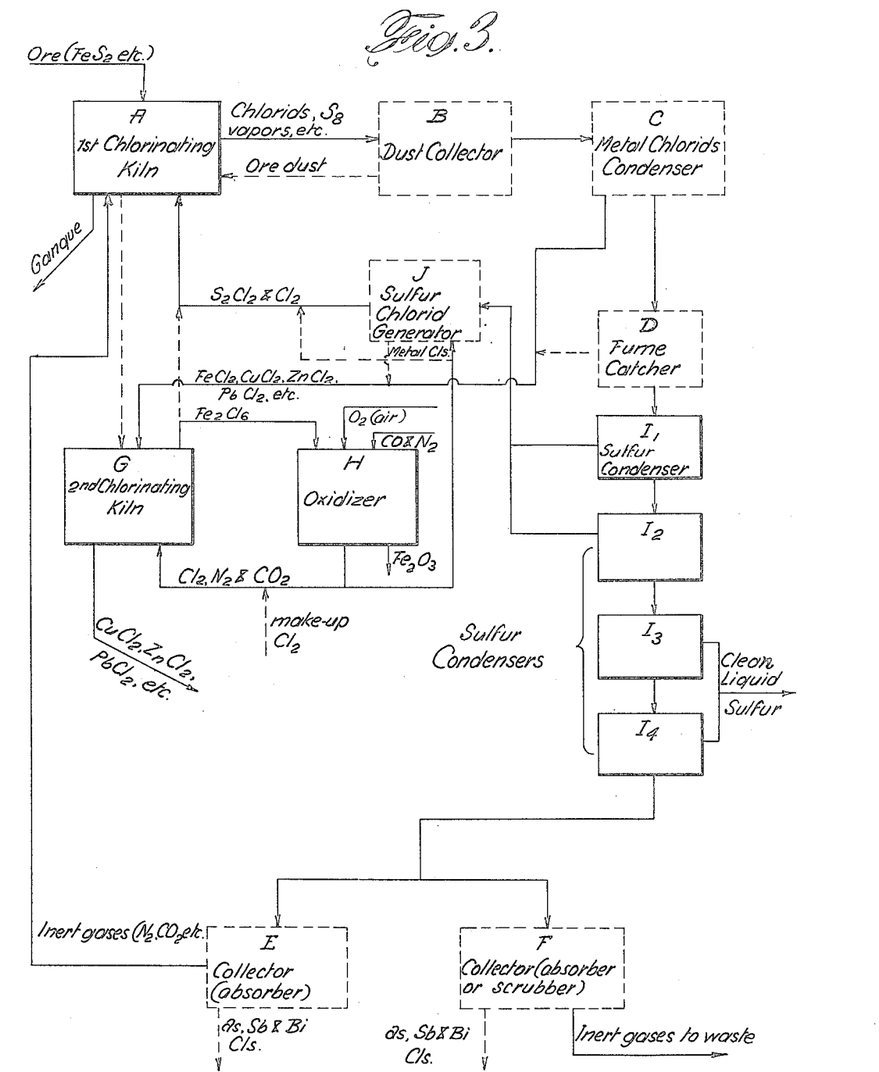
Fig. 3 is a flow sheet illustrating diagrammatically one form of the process as applied to the treatment of sulfid ores.

Fig. 3 represents diagrammatically the several steps of the process as modified to apply to the treatment of ores containing iron in combination with sulfur.

According to Fig. 3, the ore, which may be either finely divided or in lump form, is fed into furnace A. The ore meets a stream of inert gas and chlorinating agent, which may be chlorin, sulfur chlorid or ferric chlorid or any combination of these, all of which are or may be derived from later stages of the process. The iron and other sulfids of the ore are reacted upon with the formation of free sulfur and chlorids. The temperature of the furnace is so controlled that no commercially important amount of ferrous chlorid leaves A with the gangue and the temperature and amount of inert gas are preferably so controlled that no substantial amount of ferrous chlorid exists in the furnace A in a state of bulk fusion; and so that all the chlorids or substantially all the chlorids are either volatilized as fast as formed or otherwise immediately removed from the surfaces of the ore particles.

The exit gases and vapors from the furnace A are passed through B and C, and optionally through D, in the same way as in Figs. 1 and 2, the gases exiting from D above the dew point of sulfur being passed successively through a series of sulfur condensers $I_1$ to $I_4$. It is usually preferred, however, to omit the fume catcher D since it is found that residue of fume can be very effectively caught in the first one or two of the sulfur condensers, the condensed sulfur serving to make the fume sticky so that it is readily caught on the walls from which it is flushed down by further flow of condensed sulfur. The dirty sulfur, together with as much clean sulfur as may be desired, if any, is passed to the sulfur chlorid generator J to which also comes a stream of chlorin and nitrogen derived from a later stage of operation. Here the sulfur is converted to sulfur chlorid vapors that go forward to furnace A. Although any chlorid of sulfur may be used in the chlorinating operation, it is advantageous to use $S_2Cl_2$ or a sulfur-chlorin compound or mixture containing at least the proportion of chlorin present in $S_2Cl_2$. Accordingly, the process permits of considerable variation in the rate of chlorin supply and of the other conditions for sulfur chlorid generation. Residue of solid chlorids accumulating from the fume in J is removed from time to time and treated in G to separate any residual iron chlorid.

Clean liquid sulfur is drawn off from the condensers $I_3$ and $I_4$ for use or sale. The exit gases from $I_4$ may be split into two streams, respectively passing through collector or adsorber E and a collector, adsorber or scrubber F for the removal of metalloid chlorids as previously described, any desired amount of inert gas from E passing to furnace A.

The solid chlorids condensed in C are passed as before to furnace G through which they pass in the presence of, and preferably in countercurrent to a stream of chlorin and inert gas. In G the ferrous chlorid is converted to ferric chlorid that passes off in vapor form and goes to the oxidizer H wherein the ferric chlorid is oxidized in known manner to produce iron oxid and a stream of chlorin and inert gas, which stream is split into a minor flow going to G and a major flow going to the sulfur chlorid generator J. Any part of the vapor flow not needed in the sulfur chlorid generator may be passed directly to A. Any chlorin required to make up losses may be added to the minor flow entering G, or it may be added as chlorin or sulfur chlorid at J. The temperature control in G is the same as in the case of Fig. 1.

This form of the process may be modified by passing any desired amount of ferric chlorid direct from G to A so long as enough ferric chlorid is led to the oxidizer H to furnish the chlorin necessary for the operation in G and for the operation in J.

According to another modified form of the process shown in Fig. 3 the temperature in A may be so limited as to volatilize therein all, commercially speaking, of the chlorinatable metals other than iron, while volatilizing only a part of the iron; usually necessarily from 20 to 30%. When this is done both C and D may be omitted if desired, all the volatilized heavy metal chlorids being condensed with sulfur in $I_1$ and $I_2$. These chlorids after removing the sulfur therefrom in J may be led to G for further treatment.

When so operating the gangue exiting from A contains as ferrous chlorid a large part of the iron originally present in the ore. This ferrous chlorid may be oxidized to iron oxid in ways and with apparatus that will be obvious from other disclosures herein and the chlorinating gases produced may be returned to the cycle. For example, this gangue and ferrous chlorid may be passed directly into G. In so operating, it is preferred to supply sufficient chlorin to the sulfur chlorid generator J not only to displace the sulfur present in the sulfur-metal chlorid mixture led thereto, but also to convert the ferrous chlorid therein to ferric chlorid, the sulfur chlorid and ferric chlorid so produced being led to the furnace A, whereby the non-ferrous metal chlorids are left in condition for separation and refining by known processes. When the process is so operated the solids exiting from G will consist substantially of iron oxid and gangue.

It is to be noted that the form of the process outlined in Fig. 3 and hereinbefore described produces from oxid in coarsely crystalline form and that the chlorids of the non-ferrous metals present are produced in anhydrous form. When it is not important to recover the iron oxid in the coarsely crystalline form and/or when there is no advantage in having the chlorids of copper, etc. in the anhydrous form, the modifications of the process outlined in Figs. 4 and 5 may then be applied to advantage.

Figure 4:
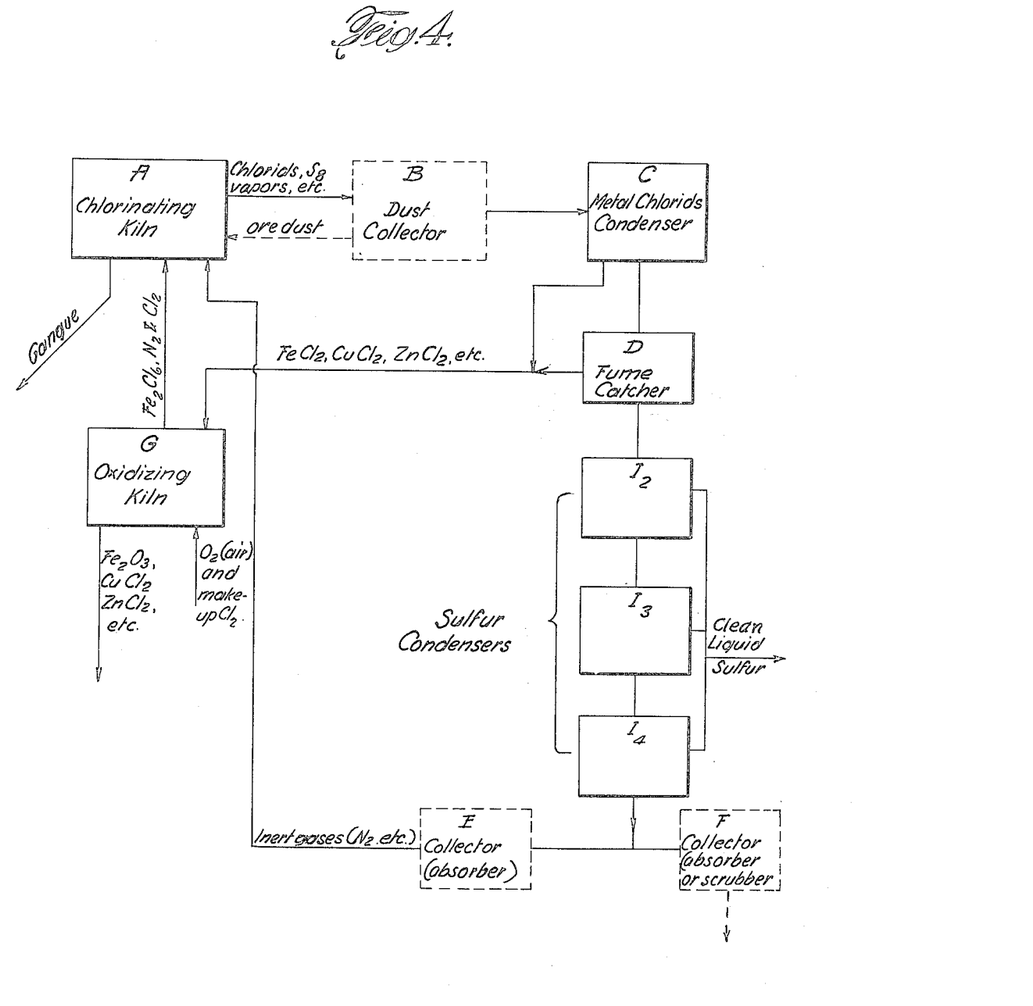
Fig. 4 is a flow sheet illustrating diagrammatically another form of the process as applied to the treatment of sulfid ores.
Figure 5:
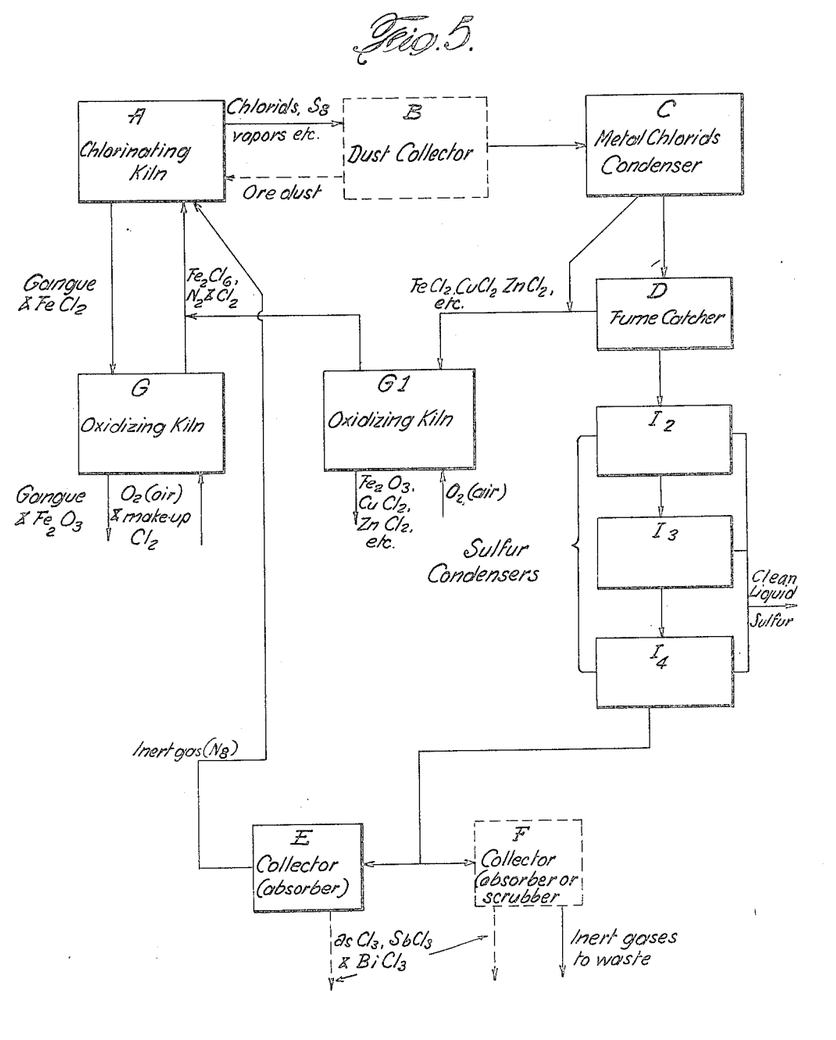
Fig. 5 is a flow sheet illustrating diagrammatically still another form of the process as applied to the treatment of sulfid ores.

The various elements of apparatus required for carrying out the modifications indicated in Figs. 4 and 5 are the same as those hereinbefore described except that according to the modification of Fig. 5 a second furnace G is required.

The choice between the two modifications depends upon various economic factors, the modification shown in Fig. 5 requiring the leaching of relatively small amounts of ferric oxid for the recovery of the chlorids of other metals.

According to the process as outlined in Fig. 4, the chlorinating operation is carried on in A with complete volatilization of both iron and other metal chlorids, all of which are transferred to G and there oxidized by the oxygen of the air or an equivalent oxidizing agent at controlled temperatures in the manner hereinbefore set forth, whereby chlorinating vapors or gases are produced containing ferric chlorid but free from the chlorids of other heavy metals, these vapors or gases being passed to the initial chlorinating furnace A. The solids discharged from G contain gangue, ferric oxid, and the chlorids of other heavy metals, which chlorids may be recovered by leaching.

The process of Fig. 5 differs from that of Fig. 4 only in that the temperature in furnace A and the amount of inert gases fed back to it are so controlled that there is practically complete volatilization of non-ferrous heavy metals, but not of iron; that is to say, such that the gangue and ferrous chlorid exiting from A are free from commercially important amounts of other heavy metal chlorids. In order to accomplish this, either the temperature of A or the amount of inert gas fed to A, or both, will be lower with any given ore than would be the case when operating according to the modification of Fig. 4.

When so operating, the gangue and ferrous chlorid from A are treated in G with air to oxidize the chlorid. The chlorinating gases produced are passed to A and the gangue and resulting ferric oxid, containing only traces of chlorids and not requiring leaching before sintering or other beneficiating treatment, are discharged. Condensed chlorids are treated in $G_1$, the solid ferric oxid produced being free from gangue and containing in soluble form all, commercially speaking, of the other heavy metal chlorids.

It is impracticable to give a single fixed rule correlating the necessary temperature and amount of inert gas that will suffice for the complete volatilization of ferrous and other chlorids from every ore as these quantities are influenced by every variation in analysis. In general the effects of temperature and of inert gas are supplementary to each other such that with the higher temperatures less inert gas is needed and vice versa.

While in the most preferred forms of the process it is operated without production of any extensive quantities of fused chlorids, many of the benefits of the invention can be obtained when fusion is permitted; such operation still permits the recovery of iron oxid free from gangue in either a fine or coarse state and either with or without nickel and cobalt oxids, the recovery of the chlorids of other metals in anhydrous form, the recovery of all the sulfur, if present, free from metal chlorids, and the recovery of anhydrous metalloid chlorids.

Sulfid ores in general do not require quite as much inert gas dilution as is necessary with oxid ores. The presence of other metals such as copper, zinc and lead, and particularly of metalloids, also exerts an influence in the general direction of decreasing the amount of inert gas necessary.

The fume collecting apparatus (i. e., D in Figs. 1–5, inclusive) is expensive both in first and operating cost. It has been shown how its use may be obviated when ore containing sulfur is being treated. When sulfur is not present in the ores being treated it may be added in any form to the cycle, e. g., as elemental sulfur, as pyrites added to the ore being treated, or by feeding make-up chlorin in the form of sulfur chlorid. In such case the sulfur is used merely as a collecting agent, all the output of the sulfur condensers being returned to the cycle and only enough sulfur being added to maintain the necessary supply in the system.

Other suitable water free vapors may be used cyclically as fume collecting agents. Such vapors must be inert to the chlorinating actions going on and should be readily condensable without serious loss in exit inert gases; that is to say, when the vapors are condensed the resulting liquid should have an exceedingly low vapor pressure at the temperature of cooling water obtainable. Metalloid chlorids, and particularly bismuth chlorid, are suitable.

While sulfur chlorid and ferric chlorid can be used as agents for chlorinating ore according to the present process, it is preferable to use chlorin in the elemental form wherever other considerations do not outweigh the advantages that may be derived by so adjusting operating conditions as to recover the chlorin for re-use in such form. When in the operation of the process part of the sulfur recovered is contaminated with chlorid impurities, it becomes economic to utilize such sulfur in forming sulfur chlorid to be used as a chlorinating agent in the process, but there is no particular advantage in using more sulfur chlorid than is necessarily produced in disposing of such impure sulfur; on the other hand, the use of greater quantities does no especial harm.

The use of excessive amounts of ferric chlorid has decided disadvantages requiring the use of greater amounts of inert gases, or higher temperatures, (or both), than would otherwise be necessary.

The term "metalloid chlorids" as used hereinbefore in the specification and in the appended claims is not to be taken as limited definitely to that class of elements known as metalloids, such as arsenic and antimony, but is to be taken as including bismuth and those other elements whose chlorids have a substantial vapor pressure at temperatures between 115° and 160° C.,—the range within which sulfur condenses as a liquid from the gaseous mixtures produced according to the present invention.

It will be understood that various changes may be made in the details of the procedure outlined and in the apparatus used in carrying out the process without departing from the invention, which is not to be deemed as limited other than as indicated in the appended claims.

What I claim is:

1. The process of treating in a dry way and at elevated temperatures materials containing iron and optionally containing other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating any non-ferrous heavy metal chlorids present and at least part of said ferrous chlorid from the gangue by vaporization, condensing the chlorids so vaporized, treating said ferrous chlorid to convert the iron into oxid with simultaneous generation of dilute chlorinating gases and using dilute chlorinating gases so generated to chlorinate fresh material.

2. The process of treating in a dry way and at elevated temperatures materials containing iron and optionally containing other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating any non-ferrous heavy metal chlorids present and at least part of said ferrous chlorid from the gangue by vaporization, condensing the chlorids so vaporized with separation therefrom of inert gases, treating said ferrous chlorid to convert the iron into oxid with generation of chlorinating gases, and using gases so generated in admixture with said inert gases to chlorinate fresh material.

3. The process of treating in the dry way and at elevated temperatures materials containing iron and optionally containing other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating any non-ferrous heavy metal chlorids present and at least part of said ferrous chlorid from the gangue by vaporization, condensing the chlorids so vaporized with voidance from the cycle of part but not all of the inert gases passed with said chlorids to the condenser, treating said ferrous chlorid to form iron oxid with generation of dilute chlorinating gases, and using gases so generated in admixture with the unvoided portion of inert gases coming from the condenser to chlorinate fresh material.

4. The process of treating in a dry way and at elevated temperatures materials containing iron and optionally containing other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values as vapors substantially as fast as formed, condensing the ferrous chlorid so withdrawn, treating said chlorid to convert the iron into oxid with simultaneous generation of chlorinating gases, and using the gases so generated in admixture with an inert diluent gas to chlorinate fresh material.

5. The process of treating material containing iron and other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating any non-ferrous heavy metal chlorids present and at least part of said ferrous chlorid from the gangue by vaporization, condensing the ferrous chlorid so vaporized, treating said chlorid with dilute chlorin in such amount and at such temperature as to produce ferric chlorid vapors, oxidizing said ferric chlorid vapors, thereby forming iron oxid and dilute chlorin, and using dilute chlorin so generated to chlorinate fresh material.

6. The process of treating material containing iron and other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values as vapors substantially as fast as formed, condensing the ferrous chlorid so withdrawn, treating said chlorid with dilute chlorin in such amount and at such temperature as to produce ferric chlorid vapors, oxidizing said ferric chlorid vapors, thereby forming iron oxid and chlorin, and using chlorin so generated in admixture with an inert diluent gas to chlorinate fresh material.

7. The process of treating material containing iron and other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating said chlorid from the gangue by vaporization, condensing the ferrous chlorid so vaporized, subjecting said chlorid to controlled oxidation to convert the ferrous chlorid to ferric chlorid and iron oxid, and using the ferric chlorid in vapor form in admixture with an inert diluent gas to chlorinate fresh material.

8. The process of treating material containing iron and other values with cyclic use of chlorin which comprises supplying such a material to a chlorinating zone, chlorinating iron present therein to ferrous chlorid with a gaseous mixture of a chlorinating agent and inert diluent gas, separating said chlorid and other values from the gangue by vaporization, condensing the ferrous chlorid so vaporized, subjecting said chlorid to controlled oxidation to convert the ferrous chlorid to ferric chlorid and iron oxid, and using the ferric chlorid in vapor form to chlorinate fresh material.

9. The process of treating materials containing iron and other values with cyclic use of chlorin, which comprises treating the material with chlorinating gases at such temperatures and in the presence of such amounts of inert gases as to preclude the existence in the chlorinating zone of any substantial amounts of solids in a state of bulk fusion, such temperatures and amounts of inert gases being sufficient to cause volatilization of substantially all of the values other than iron as chlorids as well as the volatilization of at least a large part of the iron as chlorid, treating said chlorid and other values to separate iron from the other values and to recover it in the form of oxid, simultaneously generating chlorinating gases, and using the gases so generated to chlorinate fresh material.

10. The process of treating materials containing iron and other metal values with cyclic use of chlorin, which comprises treating such a material with chlorinating gases at such temperatures and in the presence of such amounts of inert gases as to preclude the formation of any extensive amount of fused chlorids, such temperatures and amounts of inert gases being sufficient to cause volatilization of substantially all of the chlorinatable metals other than iron as chlorids as well as the volatilization of at least a large part of the iron as ferrous chlorid, thereby separating said chlorids from gangue, condensing such metal chlorids, treating the condensed chlorids to separate iron from the other values and to recover it in the form of oxid, simultaneously generating chlorinating gases, and using the gases so generated to chlorinate fresh material.

11. The process of treating materials containing iron and other metal values with cyclic use of chlorin, which comprises treating such a material with chlorinating gases at such temperatures and in the presence of such amounts of inert gases as to preclude the formation of any extensive amount of fused chlorids, such temperatures and amounts of inert gases being sufficient to cause volatilization of substantially all of the chlorinatable metals other than iron as chlorids as well as the volatilization of at least a large part of the iron as ferrous chlorid, thereby separating said chlorids from gangue, condensing such metal chlorids, subjecting such mixture of chlorids to controlled oxidation to convert the iron to oxid and simultaneously to generate chlorinating gases, using the gases so generated to chlorinate fresh material, and separating the iron from the non-ferrous metal chlorids.

12. The process of treating materials containing iron and other metal values with cyclic use of chlorin which comprises supplying such a material to a chlorinating zone, chlorinating the iron and other chlorinatable metal values therein with a gaseous mixture of a chlorinating agent and an inert diluent gas, withdrawing the chlorids so formed from reaction-inhibiting relation with said material and separating said chlorids from the gangue by vaporization, condensing the chlorids so vaporized and leading them to an oxidizing zone, subjecting said chlorids to selective oxidation in said zone to convert the iron to oxid and to generate chlorinating gases, leading said gases to the chlorinating zone to treat further amounts of said material, and separating the unoxidized chlorids from the iron oxid so formed.

13. The process of treating materials containing iron and other metal values with cyclic use of chlorin which comprises supplying such a material to a chlorinating zone, chlorinating the iron and other chlorinatable metal values therein with a gaseous mixture of a chlorinating agent and an inert diluent gas, withdrawing the chlorids so formed from said zone as vapors substantially as fast as formed, condensing the chlorids so withdrawn and leading them to an oxidizing zone, subjecting said chlorids to selective oxidation in said zone to convert the iron to oxid and to generate chlorinating gases, leading said gases to the chlorinating zone to treat further amounts of said material, and separating the unoxidized chlorids from the iron oxid so formed.

14. The process of treating materials containing iron and other metal values with cyclic use of chlorin which comprises supplying such a material to a chlorinating zone, chlorinating the iron and other chlorinatable metal values therein with a gaseous mixture of a chlorinating agent and an inert diluent gas, withdrawing the chlorids so formed from reaction-inhibiting relation with said material and separating said chlorids from the gangue by vaporization, condensing the chlorids so vaporized and leading them to an oxidizing zone, selectively treating the iron chlorid constituent of said condensed chlorids to convert the iron into oxid with simultaneous generation of chlorinating gases, and leading said gases to the chlorinating zone to treat further amounts of said material.

15. The process of treating materials containing iron and other heavy metal values with cyclic use of chlorin which comprises supplying such a material to a chlorinating zone, converting iron present to ferrous chlorid form and other chlorinatable metal values to chlorid form with a gaseous mixture of a chlorinating agent and an inert diluent gas, withdrawing said chlorids from reaction-inhibiting relation with said material and separating non-ferrous metal chlorids present and at least part of said ferrous chlorid from the gangue by vaporization, condensing the chlorids so vaporized and then forming and volatilizing off ferric chlorid, leaving the non-ferrous metal chlorids substantially free from ferric oxid and/or iron chlorids derived from said ferrous chlorid.

16. The process of treating materials containing iron and other metal values in oxid form with cyclic use of chlorin which comprises treating such a material to metallize the iron and other chlorinatable values therein, leading said metallized values to a chlorinating zone, chlorinating said chlorinatable values with a gaseous mixture of a chlorinating agent and an inert diluent gas, withdrawing the chlorids so formed from reaction-inhibiting relation with said material and separating said chlorids from the gangue by vaporization, condensing the chlorids so vaporized and leading them to an oxidizing zone, selectively treating the iron chlorid constituent of said condensed chlorids to convert the iron into oxid with simultaneous generation of chlorinating gases, and leading said gases to the chlorinating zone to treat further amounts of said material.

17. The process of treating materials containing iron and other metal values in oxid form with cyclic use of chlorin which comprises treating such a material to metallize the iron and other chlorinatable values therein, leading said metallized values to a chlorinating zone, chlorinating said chlorinatable values with a gaseous mixture of a chlorinating agent and an inert diluent gas, withdrawing the chlorids so formed from said zone as vapors substantially as fast as formed, condensing the chlorids so withdrawn and leading them to an oxidizing zone, selectively treating the iron chlorid constituent of said condensed chlorids to convert the iron into oxid with simultaneous generation of chlorinating gases, and leading said gases to the chlorinating zone to treat further amounts of said material.

18. The process of treating materials containing iron and other metal values in oxid form with cyclic use of chlorin which comprises treating such a material to metallize the iron and other chlorinatable metal values therein, leading said metallized values to a chlorinating zone, chlorinating said chlorinatable values with a gaseous mixture of a chlorinating agent and an inert diluent gas, withdrawing the chlorids so formed from reaction-inhibiting relation with said material and separating said chlorids from the gangue by vaporization, condensing the chlorids so vaporized and leading them to an oxidizing zone, treating said chlorids in said zone to convert the metal values therein to oxid form with simultaneous generation of chlorinating gases and leading said gases to the chlorinating zone to treat further amounts of said material.

19. A cyclic chlorination process for treating in the dry way and at elevated temperatures material containing iron in combination with sulfur, and optionally containing other values, for the recovery of substantially pure sulfur and of all or a substantial part of the iron as iron oxid unmixed with gangue impurities, wherein such material is treated with a gaseous mixture of a chlorinating agent and an inert diluent gas so that sulfur is displaced as such with formation of ferrous chlorid, withdrawing said sulfur, ferrous chlorid and other values from reaction-inhibiting relation with said material and separating said sulfur, any non-ferrous heavy metal chlorids present, and at least part of said ferrous chlorid, from the gangue by vaporization, condensing and separating the chlorids and the sulfur so vaporized, treating the chlorids to form iron oxid with generation of dilute chlorinating gases, and using dilute chlorinating gases so generated to chlorinate fresh material.

20. The process of treating materials containing iron in combination with sulfur with cyclic use of chlorin which comprises treating the material with chlorinating gases at such temperatures and in the presence of such amounts of inert gases as to chlorinate the iron present therein to ferrous chlorid while precluding the formation of an extensive amount of fused chlorids, such temperatures and amounts of inert gases being sufficient to cause volatilization of substantially all of the sulfur liberated as well as of at least a large part of the ferrous chlorid, withdrawing said volatilized ferrous chlorid and sulfur from reaction-inhibiting relation with said material and separating and condensing the ferrous chlorid and sulfur vapors, treating the condensed ferrous chlorid with air to convert the iron to oxid and simultaneously to generate dilute chlorinating gases, and using the gases so generated to chlorinate fresh material.

21. The process of treating materials containing iron in combination with sulfur and including other metal values with cyclic use of chlorin which comprises supplying such material to a chlorinating zone, chlorinating the iron and other chlorinatable metal values therein with liberation of sulfur with a gaseous mixture of a chlorinating agent and an inert diluent gas, withdrawing the chlorids so formed and the sulfur as vapors substantially as fast as formed, fractionally condensing said vapors to produce a metal chlorid fraction, an impure sulfur fraction, and a substantially pure sulfur fraction, treating the condensed chlorid fraction to separate iron from the other metal values and to recover it in the form of oxid with the simultaneous liberation of chlorin, leading at least a portion of the impure sulfur fraction into chlorin-absorbing relation with the liberated chlorin to produce sulfur chlorid vapors, and leading said vapors to the chlorinating zone to treat further amounts of said material.

22. In a process of treating in the dry way and at elevated temperatures materials containing iron in combination with sulfur and including other metal and metalloid values with cyclic use of chlorin, the steps which comprise chlorinating said material with a dilute gaseous chlorinating agent to form ferrous chlorid, sulfur and chlorids of other values, separating the chlorids formed and the liberated sulfur from the gangue by volatilization, treating the said chlorids and sulfur successively to condense ferrous chlorid and like chlorids, sulfur and the metalloid chlorids, all in anhydrous form, and recovering said ferrous chlorid and like chlorids, and the metalloid chlorids separately from the sulfur and from each other.

23. The process of treating in the dry way and at elevated temperatures material containing iron and optionally containing other values with cyclic use of chlorin which comprises supplying such a material to a chlorinating zone, chlorinating iron present therein to ferrous chlorid with a gaseous mixture of a chlorinating agent and an inert diluent gas, withdrawing said chlorid and other values from reaction-inhibiting relation with said material and separating any non-ferrous heavy metal chlorids present and at least part of said ferrous chlorid from the gangue by vaporization, treating said ferrous chlorid to form iron oxid with generation of dilute chlorinating gases and using dilute chlorinating gases so generated to chlorinate fresh material.

In testimony whereof, I have signed my name to this specification this 20th day of May, 1929.

ERNEST W. WESCOTT.